(12) United States Patent
Jeong

(10) Patent No.: US 7,174,511 B2
(45) Date of Patent: Feb. 6, 2007

(54) METHOD OF REPRODUCING A MULTI-SESSION DISK

(75) Inventor: Jong Hyeok Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 10/087,759

(22) Filed: Mar. 5, 2002

(65) Prior Publication Data

US 2002/0126552 A1  Sep. 12, 2002

(30) Foreign Application Priority Data

Mar. 8, 2001 (KR) .............................. 2001-12063

(51) Int. Cl.
*G06F 7/24* (2006.01)
(52) U.S. Cl. ............... 715/716; 715/719; 715/727; 715/810
(58) Field of Classification Search ........ 715/716–732, 715/810–830, 840; 707/1, 2, 101–102, 104.1, 707/7, 200, 205; 369/47–60; 386/46, 95, 386/125, 126
See application file for complete search history.

(56) References Cited

U.S. PATENT DOCUMENTS

| | | | | |
|---|---|---|---|---|
| 5,864,868 | A * | 1/1999 | Contois | 707/104.1 |
| 6,047,292 | A * | 4/2000 | Kelly et al. | 715/716 |
| 6,122,436 | A * | 9/2000 | Okada et al. | 386/126 |
| 6,169,543 | B1 * | 1/2001 | Wehmeyer | 725/47 |
| 6,356,971 | B1 * | 3/2002 | Katz et al. | 710/301 |
| 6,445,877 | B1 * | 9/2002 | Okada et al. | 386/95 |
| 6,463,022 | B1 * | 10/2002 | Ito et al. | 369/53.24 |
| 6,510,127 | B1 * | 1/2003 | Kim | 369/275.2 |
| 6,609,105 | B2 * | 8/2003 | Van Zoest et al. | 705/14 |
| 6,631,107 | B1 * | 10/2003 | Ito et al. | 369/53.2 |
| 6,671,249 | B2 * | 12/2003 | Horie | 369/275.3 |
| 6,725,258 | B1 * | 4/2004 | Bick et al. | 709/219 |
| 6,807,132 | B1 * | 10/2004 | Lee | 369/32.01 |
| 7,050,701 | B1 * | 5/2006 | Sasaki et al. | 386/95 |
| 2002/0031332 | A1 * | 3/2002 | Ando et al. | 386/46 |
| 2002/0064111 | A1 * | 5/2002 | Horie | 369/47.54 |
| 2003/0228141 | A1 * | 12/2003 | Ballantyne | 386/125 |
| 2004/0068536 | A1 * | 4/2004 | Demers et al. | 709/201 |
| 2004/0096194 | A1 * | 5/2004 | Tanaka et al. | 386/96 |

* cited by examiner

*Primary Examiner*—Ba Huynh
(74) *Attorney, Agent, or Firm*—Birch, Stewart, Kolasch & Birch, LLP

(57) ABSTRACT

The present invention relates to a method of selectively reproducing a desired type of data from a multi-session disk in which various types of data have been recorded on sessions. The method of reproducing a recording medium containing same type of contents in each session identifies each type of a plurality of sessions sequentially, composes type telling information based on the identified types wherein information indicative of same type of data sections is to be collectively placed when the type telling information is viewed, presents the type telling information with a choice button or box for a user's selecting an arbitrary type, and selectively reproduces data sections corresponding to a selected type from a user. According to this method, it is possible for a user to recognize easily all types of data recorded on a multi-session disk containing various types of data, whereby a user can request reproduction or copy of same type data quite conveniently.

11 Claims, 4 Drawing Sheets

✓ : *mark for selected*

METHOD OF REPRODUCING A MULTI-SESSION DISK

BACKGROUND OF THE INVENTION

1. Field of the Invention

The present invention relates to a multi-session disk reproducing method, more particularly, to a method of selectively reproducing a desired type of data sections from a multi-session disk in which various types of data have been recorded on sessions.

2. Description of the Related Art

A Compact Disk, generically called 'CD', contains high-quality digital audio data on it. Besides a read-only CD, a writable disk such as a CD-R and a CD-RW has been developed lately. Because a user can write digital audio data onto a writable disk freely, the writable disk is being widely used at present.

In addition, because a user can edit data written onto the CD-R or CD-RW at his or her pleasure, data of different attributes, e.g., audio, video, and text data may be written all together on a single writable disk. If the attribute of data to be written newly is different from that of data having been written, the data is written not on previous session but on a new session.

Therefore, there may be several sessions in a CD-R or CD-RW where each session groups data of same attribute. A CD-R or a CD-RW having such multi sessions is called 'multi-session disk'.

However, when a multi-session disk having data of different attributes is inserted in a disk device, the disk device identifies disk type only or checks the data attribute of the first session only. As a result, a user can not know all attributes of data written on an inserted multi-session disk with ease, and it is tedious to have data of desired attribute selected and reproduced if the data of desired attribute has been written after the first session. Moreover, if several sessions contain data of desired attribute it is very inconvenient to have entire data of desired attribute reproduced.

SUMMARY OF THE INVENTION

It is an object of the present invention to provide a multi-session disk reproducing method of detecting all types of data written on a multi-session disk, in which various types of data have been recorded on sessions, at an initial step and providing a menu screen for user's selection of a desired type in order that selection and reproduction of all or partial data of a desired type might be conducted conveniently.

A method of reproducing a recording medium containing same type of contents in each session in accordance with the present invention identifies each type of a plurality of sessions sequentially, composes type telling information based on the identified types wherein information indicative of same type of data sections is to be collectively placed when the type telling information is viewed, presents the type telling information with at least a choice button or a check box for a user's selecting an arbitrary type, and selectively reproduces data sections corresponding to a selected type from a user.

The present invention may be embodied in other specific forms without departing from the sprit or essential characteristics thereof. The present embodiments are therefore to be considered in all respects as illustrative and not restrictive, the scope of the invention being indicated by the appended claims rather than by the following description and all changes which come within the meaning and range of equivalency of the claims are therefore intended to be embraced therein.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENT

In order that the invention may be fully understood, a preferred embodiment thereof will now be described with reference to the accompanying drawings.

Figure 1:
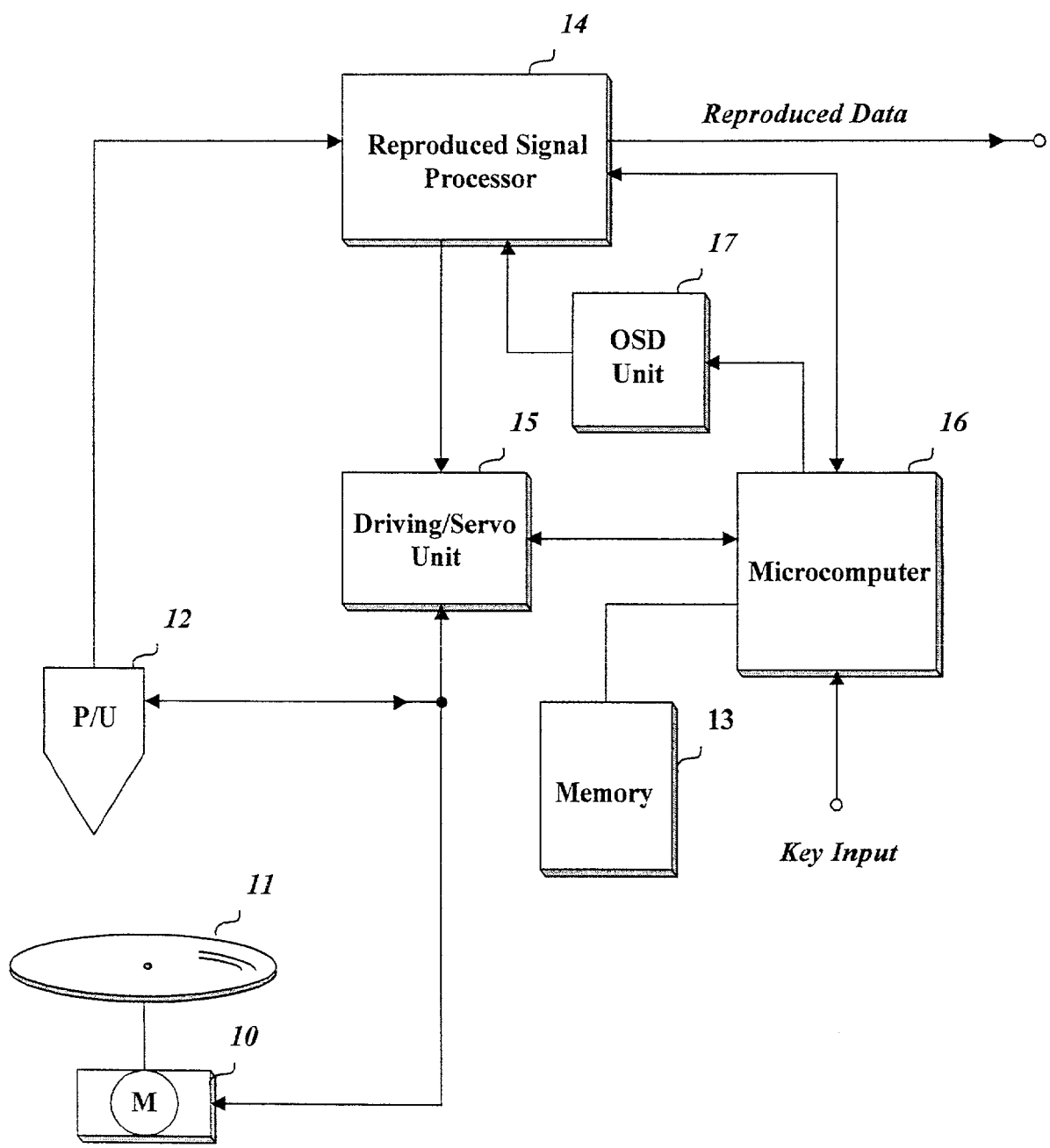
FIG. 1 is a simplified block diagram of a disk device to which a multi-session disk reproducing method according to the present invention is applicable.

FIG. 1 is a simplified block diagram of a disk device to which a multi-session disk reproducing method according to the present invention is applicable. The disk device of FIG. 1 comprises an optical pickup 12 for reading data from a multi-session disk 11, for example, a CD-RW; a reproduced signal processor 14 for processing the read signals by the optical pickup 12 to restore original digital data; a driving/servo unit 15 for driving the multi-session disk 11 and conducting servo operation for stable reproduction of the rewritable disk 11; a microcomputer 16 for supervising all elements to conduct reproduction; a memory 13 for storing temporary data produced during reproduction and control; and an OSD unit 17 for presenting menu data etc. composed by the microcomputer 16.

When the multi-session disk 11 is placed onto a disk holder (not figured) of the disk device configured as FIG. 1, the disk device checks the data types, e.g., data attributes or data compressed schemes of data written on the disk 11, composes a menu screen for selecting desired sessions or data types to be reproduced, presents the composed menu screen through a connected television set or a monitor, and conducts session-classified or type-classified reproduction in accordance with user's selection at the menu screen. These operations are described below in detail.

Figure 2:
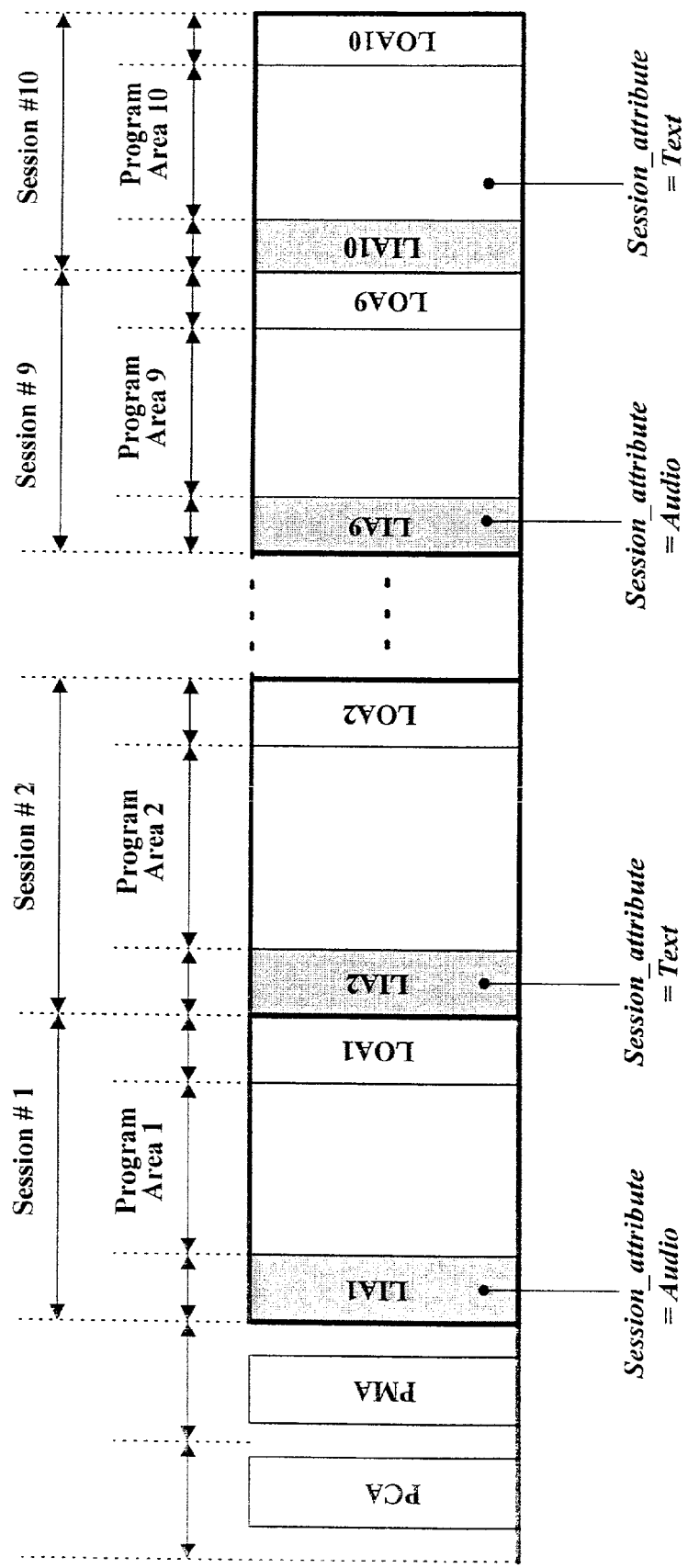
FIG. 2 is an illustrative format example of data recorded on a multi-session disk.

FIG. 2 is an illustrative format example of data recorded on the multi-session disk 11. In the example of FIG. 2, the multi-session disk 11 has ten sessions where the sessions #1 and #9 include audio data and the sessions #2 and #10 include text data. A lead-in 'LIA' and a lead-out 'LOA' area shall be allocated at the head and the tail of each session, respectively.

In addition, besides a program area where user data is to be written, the rewritable disk 11 has a PCA (Power Calibration Area) and a PMA (Program Memory Area) which are placed from most inner side, as shown in FIG. 2.

The PCA is prepared for testing a writing power to obtain an optimal writing power of a laser diode equipped in the optical pickup 12, and the PMA is reserved for temporary management information for each logical track. The temporary management information consists of a track index number, start and end position expressed in time, etc. When some tracks are grouped into a single session by a session closing operation the temporary management information written on the PMA for those tracks is copied onto a lead-in area of the closed session. Session attribute information, which is indicative of attribute of data written on a program area of a related session, is written on a corresponding lead-in area, as shown in FIG. 2.

Figure 3:
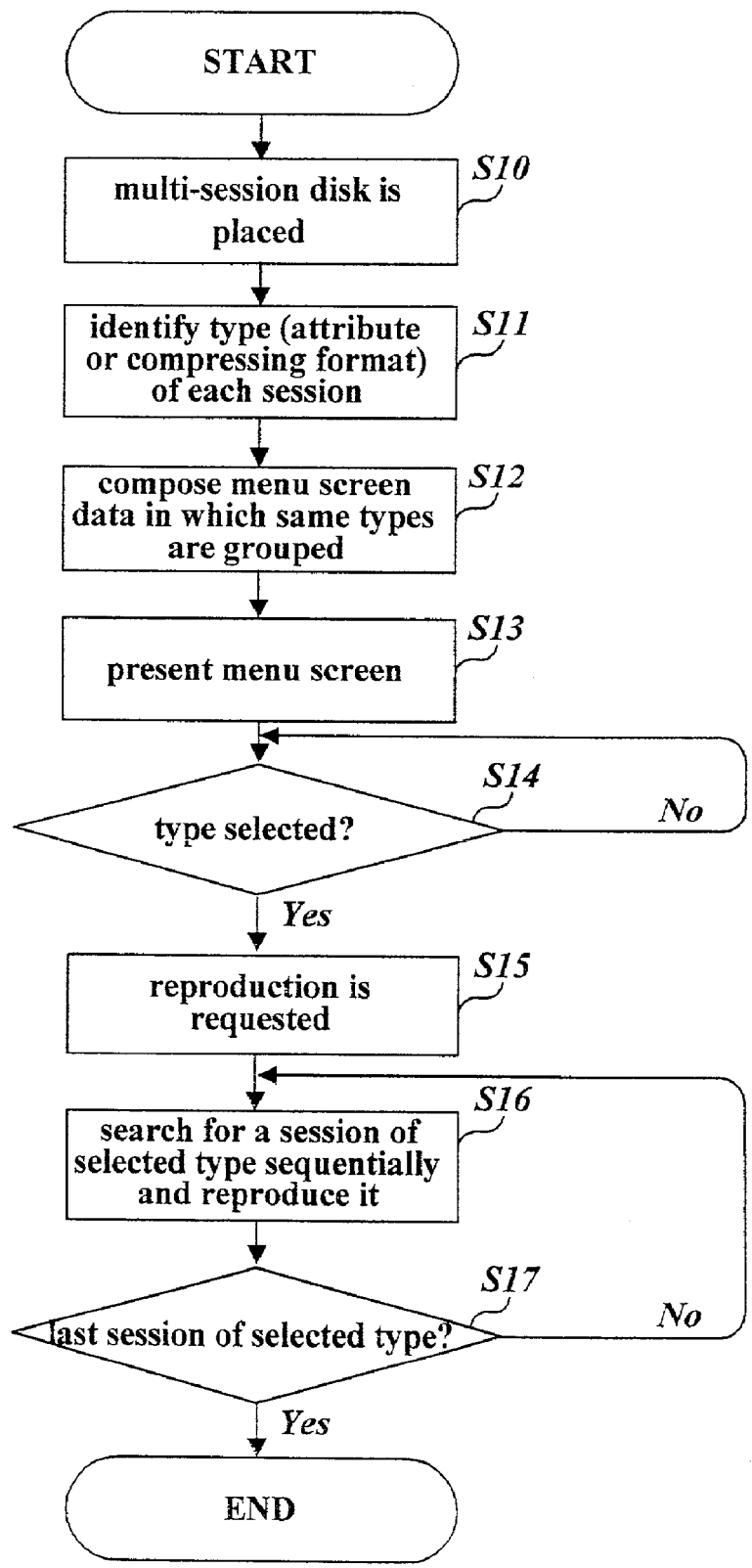
FIG. 3 is a flow chart of an embodiment of a multi-session disk reproducing method according to the present invention.

FIG. 3 is a flow chart of an embodiment of a multi-session disk reproducing method according to the present invention. The flow chart depicted in FIG. 3 is described below in detail.

When the rewritable multi-session disk 11 having data recorded as given in FIG. 2 is placed in the disk device of FIG. 1 (S10), the microcomputer 16 controls the optical pickup 12 and the reproduced signal processor 14 to read data written on all lead-in areas and identifies each attribute of all sessions through the session attribute information included in each lead-in area.

Namely, the microcomputer 16 reads out the lead-in areas LIAs #1, #2, #3, . . . sequentially with reference to chained location information written on each lead-in area and stores the read data in the memory 13. Then, it examines the read session attribute information to know the attribute of data written on each session (S11). After identification of attribute of each session, the microcomputer 16 groups session indexes pointing out sessions of same attribute, composes a menu screen data including type-classified guide information for whole grouped sessions and numeric buttons or click buttons for each type and/or each session (S12), and sends the menu screen data to the OSD unit 17 to present a menu screen onto a monitor or a television set connected to the disk device (S13).

Figure 4:
FIGS. 4 and 5 are examples of a menu screen composed and presented according to the present invention.

When composing the menu screen data, the microcomputer 16 may rearrange session positions to gather session indexes for same attributive sessions into a zone of the menu screen. Instead of rearrangement, every attributes of all sessions may be listed in session order. FIG. 4 is an example of the menu screen composed according to the above manner and presented onto an external television set or a monitor.

Thus, a user can select one, several, or all sessions of his or her desired attribute (S14) through the menu screen presented like as FIG. 4. Such selection can be conducted with a conventional input means, e.g., a remote controller or a key pad. And, each session is selected by a click through a pointer or by entering a numeric code allocated to that session through a key pad. The position and clicked or not on a pointer and the entered numeric code through a key pad are detected by a continuous input monitoring process of the microcomputer 16.

Figure 5:

The microcomputer 16 may provide a click button (or check box) for same attributive sessions on the menu screen in order that a user might select entire data of same attribute easily at a time. FIG. 5 is another illustrative menu screen is possessed of such a click button (or check box). In the example of FIG. 5, all sessions having audio data are selected by click (or check) only once.

After one attribute is selected in accordance with the above-explained manner, a session or sessions of the selected attribute are requested to be reproduced or copied by a user. If a reproduction is requested (S15), the microcomputer 16 checks the selected attribute and conducts selective reproduction of the sessions associated with the selected attribute. If audio attribute is chosen, the microcomputer 16 reads data written on a program area of the session #1 and sends them to the reproduced signal processor 14 which will restore them into original audio data, and, after all data of the session #1 is completely read out, the microcomputer 16 locates position of the session #3 with sequential reference to the lead-in areas of the sessions #1 and #2, and has the data written on a program area of the session #3 reproduced. This session selective reproduction will continue (S16,S17) until the last selected session, namely, the session #9 is completely reproduced.

The above-explained disk device is applicable to all disk players, for example, a CD player, a CD recorder, or a DVD player if it is capable of reproducing a multi-session disk.

Furthermore, each session in the aforementioned multi-session disk may be formed whenever not data attribute such as audio, video, and text but data compressing scheme such as MP3, LPCM, and AC3 is different from that of previous data. In this case, a menu screen for selecting session or sessions based on not data attribute but data compressing scheme is presented to a user.

The above-explained multi-session disk reproducing method in accordance with the present invention can make a user recognize easily all types of data recorded on a multi-session disk containing various types of data, whereby a user can request reproduction or copy of same type data quite conveniently.

What is claimed is:

1. A method of reproducing a recording medium containing different types of contents recorded in random order, comprising the steps of:
   (a) identifying all types of data written on the recording medium in sessions which are randomly arranged as to data type;
   (b) arranging and listing sessions of said data by data type;
   (c) presenting said listing in a menu screen for selecting at least one type among the identified types: and
   (d) selectively reproducing one of (1) all sessions listed under the selected type and (2) one or more data sessions listed under the selected type through the presented menu screen.

2. The method of claim 1, wherein the data written on the recording medium is grouped by at least one session.

3. The method of claim 2, wherein each session contains same type of data.

4. The method of claim 2, wherein data type information is written on each lead in area placed at the head of each session.

5. The method of claim 1, wherein the menu screen includes a choice button or box for selecting all data sessions of same type at a time.

6. The method of claim 1, wherein information indicative of same type of data sessions is collectively placed in the menu screen.

7. The method of claim 1, wherein the data type represents data attribute indicative of audio, video, or text.

8. The method of claim 1, wherein the data type represents data compressing scheme.

9. A method of reproducing a recording medium containing different types of contents in a plurality of sessions which are randomly recorded as to type, comprising the steps of:
   (a) identifying each type of the plurality of randomly recorded sessions sequentially;
   (b) composing type telling information based on the identified types wherein information indicative of same type of data sessions is to be collectively listed when the type telling information is viewed displaying said type telling information together with a listing of sections associated with each type;
(c) presenting the type telling information with a choice button or box for selecting a type; and
(d) selectively reproducing one of (1) all sessions listed under the selected type and (2) one or more data sessions corresponding to the selected type from a user.

10. The method of claim 9, wherein the data type represents data attribute indicative of audio, video, or text.

11. The method of claim 9, wherein the data type represents data compressing scheme.

* * * * *